Figure 6:
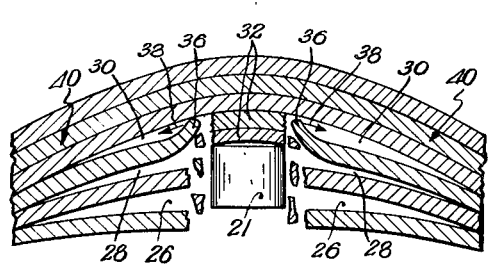

Dec. 14, 1954   A. G. H. DIETZ ET AL   2,697,054
MATERIAL FOR ABSORPTION OF KINETIC ENERGY OF MISSILES
Filed May 4, 1949   3 Sheets-Sheet 1
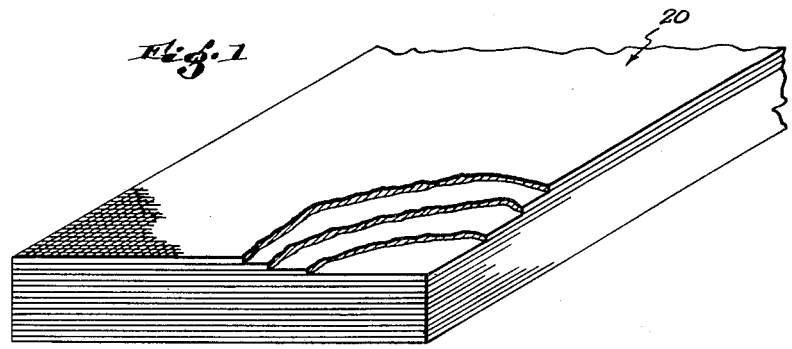
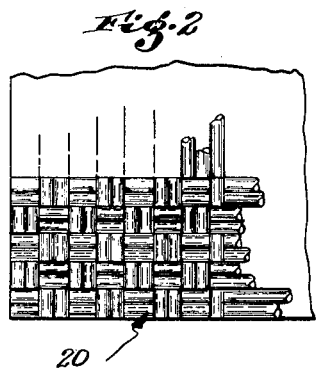
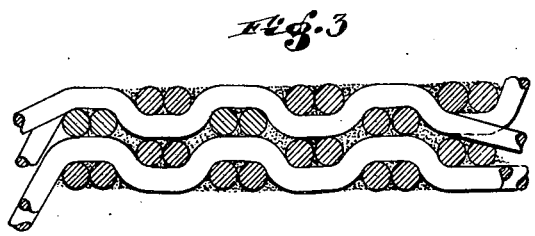
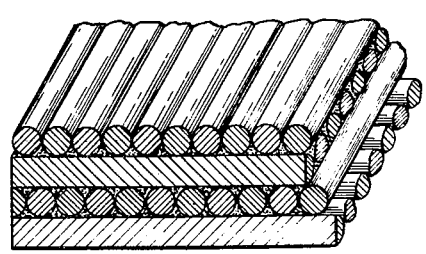
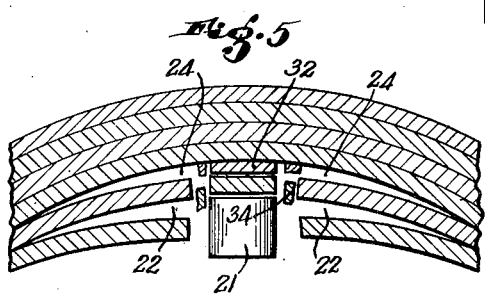

Dec. 14, 1954   A. G. H. DIETZ ET AL   2,697,054
MATERIAL FOR ABSORPTION OF KINETIC ENERGY OF MISSILES
Filed May 4, 1949                        3 Sheets-Sheet 2

Inventor
Albert G. H. Dietz
Fred E. Mooney
by Kenway, Jenney, Witter
& Hildreth   Attys.

Dec. 14, 1954  A. G. H. DIETZ ET AL  2,697,054
MATERIAL FOR ABSORPTION OF KINETIC ENERGY OF MISSILES
Filed May 4, 1949  3 Sheets-Sheet 3

Inventors
Albert G. H. Dietz
Fred E. Mooney
by Kenway, Jenney, Witter
& Hildreth Attys.

United States Patent Office 2,697,054
Patented Dec. 14, 1954

2,697,054

MATERIAL FOR ABSORPTION OF KINETIC ENERGY OF MISSILES

Albert G. H. Dietz, Winchester, and Fred E. Mooney, Harvard, Mass., assignors, by mesne assignments, to the United States of America as represented by the Secretary of the Army Application May 4, 1949, Serial No. 91,387

9 Claims. (Cl. 154—52.5)

This invention relates to shields for protection against flying fragments and other missiles, and more particularly to improved laminated plastic structures especially adapted for absorption of kinetic energy of shrapnel or the like.

In one aspect my invention consists in a novel laminated plastic armor the construction of which is based upon a new concept for the absorption of kinetic energy of shrapnel or the like in laminated armor plates. My novel construction provides for a constrained delamination of the armor under impact and penetration of a missile, resulting in a reduction of the inertial resistance of the remaining unpenetrated laminae to the missile. It further provides for a partial translation of the resistance of the armor from a shear to tension due to the increasing angle of displacement of the successive laminae as the missile penetrates. In another aspect, this invention comprises a novel laminated plastic armor plate in which the laminae on the impact side are of such character as to shatter locally in front of a penetrating missile, thus effectually increasing the impact area of the missile and thereby reducing the punching shear force of the missile per unit of area of the unpenetrated laminae.

The objects of my invention include providing an armor plate constructed in accordance with the above outlined concept of constrained delamination whereby the superior tensile strength of nylon, Fortisan, finely spun glass or the like can be employed to its fullest extent with such plastics either in combination or alone for purposes of absorbing kinetic energy of flying fragments.

Another object is to provide an armor plate which will at one and the same time be sufficiently flexible to permits its convenient use when worn as part of the clothing, be light, and be superior to steel on a weight for weight basis in shielding against flying fragments such as shrapnel.

Another object of my invention is to provide a laminated plastic armor plate which will delaminate within a restricted area under impact of a missile such that the penetrated lamina will not be firmly bonded to the lamina still intact and hinder their resistance to the missile either by adding to their inertia or by setting up lateral tensile forces.

A further object of my invention is to provide a laminated plastic armor plate wherein the successive laminae will recede progressively more during penetration of a missile, elongating in tension rather than distorting in shear.

An additional object of my invention is to provide means in such a plastic armor plate for increasing the area of the successive laminae affected by punching shear.

Still another object of my invention is to provide an armor plate composed of laminae of woven fabrics bonded together with sufficient bonding strength to deter lateral separation of the individual strands under impact and at the same time without being bonded so firmly that the woven laminae will not separate one from the other under impact or stretching.

In the accomplishment of these objects I employ laminates of nylon, Fortisan, and spun glass or the like either alone or in combination, and I provide bonding materials selected for their characteristics of preventing lateral separation of the strands within each lamina while at the same time permitting transverse separation of the laminae. When used in combination I place the substances with the greatest resistance to punching shear forces on the impact side and the substances which have the greatest properties of tensile strength and elongation towards the back side.

Another feature of my invention is the use of a single bonding material at certain percentages of saturation, which bonding material will best serve to prevent the separation of individual strands within each lamina, and at the same time allow separation of the laminae under impact and penetration.

A further feature of my invention is the use in one embodiment thereof of a 2 x 2 basket weave drawn nylon throughout the armor plate and bonding the same with a single adhesive either uniformly throughout the plate or spot bonding it at intervals.

An additional feature of another embodiment of my invention is the use of a type of nylon lamina in which all of the individual strands are continuous filaments and are not woven but rather are arranged in a first layer of parallel filaments bonded to another layer of parallel filaments at right angles to the filaments of the first layers, and using a bonding medium of strong shear strength. Laminae constructed in this manner are then bonded each to the other with a bonding material having a weak tensile strength whereby lateral separation of strands is prevented, but yet axial delamination is attained.

Figure 7:
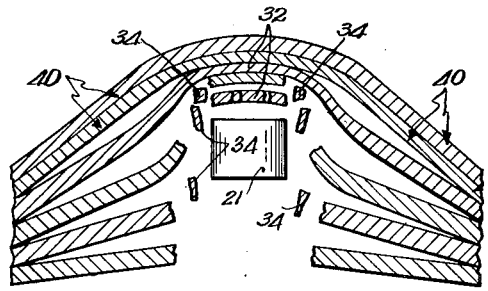
Figure 8:
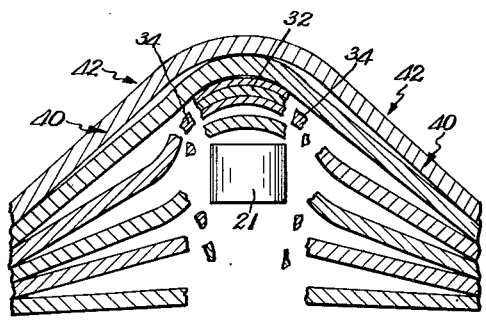
Figure 9:
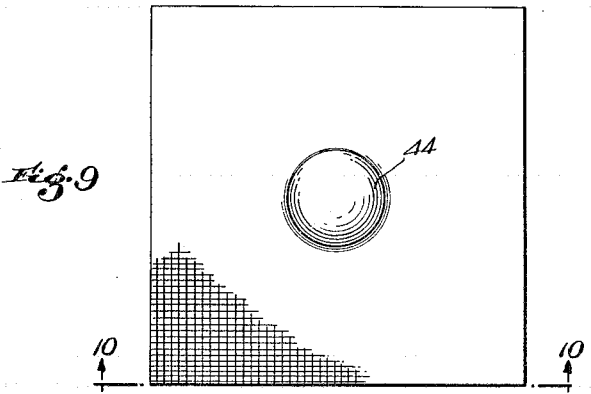
Figure 10:
Figure 11:
Figure 12:
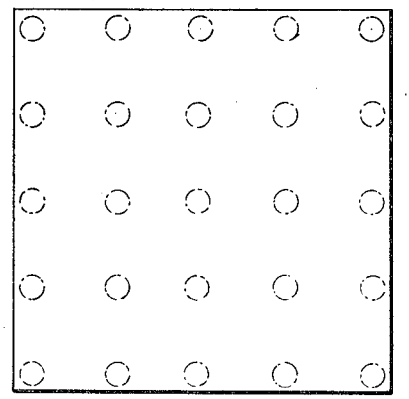

Further objects and features of my invention will best be understood and appreciated from a detailed description of several preferred embodiments thereof, selected for purposes of illustration, and shown in the accompanying drawings in which:

Fig. 1 is a view in perspective of the composite laminated armor plate of my invention with a portion broken away to show the several laminae, Fig. 2 is a plan view of the 2 x 2 basket weave construction, Fig. 3 is a view in cross section of the basket weave shown in Fig. 2, Fig. 4 is a magnified view in perspective showing the individual laminae composed of unwoven strands, Fig. 5 is a diagrammatic view in cross section illustrating the reaction of a modified armor plate of my invention, to penetration of a missile through the first two laminae, Fig. 6 is a diagrammatic view of the same as Fig. 5 except that the fragment has penetrated the first three laminae, Fig. 7 is a diagrammatic view of the same except the fragment is about to penetrate the fourth lamina, Fig. 8 is a diagrammatic view of the fragment penetrating the fourth lamina, Fig. 9 is a plan view showing the raised delaminated area after impact of a missile, Fig. 10 is a side view along the lines 10—10 of Fig. 9 showing the impact area in side elevation at the fullest point of deflection, Fig. 11 is a side view along the lines 10—10 of Fig. 9 showing the permanent distortion remaining after impact, and Fig. 12 is a plan view of the plate of my invention spot bonded.

One preferred embodiment of my invention as illustrated in Fig. 1 includes plurality of laminae of woven nylon 20 bonded together by an adhesive. As herein shown, the armor plate is composed of fifteen plies of a 2 x 2 basket weave nylon weighing 13 oz. per sq. yd., the weave of which comprises two strands over and two strands under as is illustrated in Figs. 2 and 3. Each nylon strand within the laminae 20 is composed of continuous filaments aligned substantially in parallel relationship. The adhesive employed in bonding the laminae together is impregnated uniformly throughout the bonded structure and comprises from 5% to 40% by weight of methyl methacrylate which may be 50% monomer and 50% polymer, or may be all polymer. The bonding adhesive is applied in a manner well known to the trade, e. g. by spreading, followed by curing at elevated temperatures and pressures which will vary according to the type of resin employed (e. g., if a thermosetting polyester resin of the present composition of the type described in Patent No. 2,562,951, Rose et al., is used, a curing temperature of 200–285° F. and pressure of 175–300 pounds per square inch are appropriate); care of course must be taken not to employ a temperature so high that it would injure the textile material of which the laminae are composed.

The armor plate of my invention constructed in this manner has properties of absorption of kinetic energy of flying missiles strikingly superior to that of steel. A ballistic limit test called the V50 test has demonstrated that this armor plate within the above mentioned ranges or resin content will stop a missile weighing 17 grains and having a velocity of from approximately 1430 F. P. S. to 1638 F. P. S. fifty percent of the time, (the optimum attained with a saturation of 18% resin by weight). Furthermore, this armor plate has a merit factor (determined by squaring the V50 ballistic limit and dividing by the weight per square foot) of from 80,000 to almost 100,000. These ballistics limit tests and merit factors compare strikingly with manganese steel which, in the soft and fully annealed state has a ballistic limit of 1657 F. P. S. and merit factor of 95,000, for a weight of 29/oz. ft.$^2$ but when drawn and formed into shape has a ballistic limit of 1260 F. P. S. and merit factor of 55,000.

Proceeding now to a detailed description of the reaction of the armor plate of my invention to the impact of a missile, Fig. 5 is a diagrammatic illustration of a six-ply armor plate made in accordance with my invention and under impact of a missile 21. It will be seen that the missile 21 has penetrated the first two laminae illustrated in Fig. 5, and that the remaining laminae have commenced to recede in the direction of the missile's flight. The bonding medium has shattered, allowing the plate to bend freely near the point of impact, and the first two laminae have broken away from the others as indicated at 22 and 24. Therefore, it will be evident that during the acceleration phase, the impact made by the missile 21 upon the successive layers ahead of it, will be lessened by the reduction of mass in front of it and a consequent increase in the rate of deflection of the remaining laminae. If the first two laminae in Fig. 5 had remained firmly bonded to the other laminae, it would be seen that as the missile hit the next lamina ahead while still in the acceleration phase, it would be necessary for the missile not only to accelerate those laminae which are ahead of it but also those laminae through which it had just passed. Therefore the inertial impact and punching shear force would be greater if delamination were not possible.

Turning now to Fig. 6, it will be seen that the missible 21 has proceeded through the third lamina and that the laminae likewise are separating under the impact. During the early phases of impact as illustrated in Fig. 5 when the relative motion of the missile is extremely high the initial laminae will simply shatter as indicated by fragments 32 and 24 rather than bend. However, the third lamina in Fig. 6 will be seen to have a decided bend away from the point of impact indicated at 36. This bend has a lateral component of motion normal to the path of the missile, as indicated by the arrows 22. If the laminae were firmly bonded to each other, such lateral component of motion would have the effect of subjecting the next succeeding lamina to a lateral tension localized at the point of impact, with the obvious disadvantages incidental thereto.

As the missile continues to proceed through the armor plate, the successive layers recede more and more in the direction of the missile's flight elongating in tension at 40, and as they are penetrated, they naturally attempt to return to their former position. It is likewise important therefore to allow delamination to permit the penetrated laminae to return to their former position without subjecting the remaining lamina to unnecessary tensions.

It will be seen from Figs. 7 and 8 that the area of delamination does not substantially spread after impact has once commenced to bring about the delamination. This is due to the fact that the area of bond ruptured increases as the square of the radius of the circle of deflection and the resistance to delamination soon builds up enough to prevent spreading. This is important in order to develop the full tensile strength of the nylon fabric because it is in the characteristic of tensile strength that nylon is comparable to steel. If the delamination were completely unrestrained, the angle of the laminae in advance of the missile would be more normal to the path of the missile and therefore punching shear would be the principal force resisting the missile. However when the delamination is constrained within a limited area, the missile creates a decided hump on the opposite side of the armor plate with the laminae deflecting at a substantial angle from the path of the missile as indicated at 42 in Fig. 8 and thereby translating their elongation into tension rather than shear.

The elongation in tension of the later laminae as indicated at 40 is a manifestation of work done and kinetic energy absorbed, but it has been pointed out above that the laminae are still subject to punching shear, their weakest point. In order to minimize this, it will be seen that the fragments 32 and 35 are pushed ahead of the bullet and have the effect of expanding the area effected by the punching shear force of the bullet. The methyl methacrylate resin described above is effective to promote this, but it will be seen that other suitably hard and brittle resins may be employed provided they likewise permit delamination.

| Resin | Percent Resin | No. Plies | Oz./Ft.$^2$ | V50 | Merit Factor |
|---|---|---|---|---|---|
| Polyesters: | | | | | |
|   Melamine Formaldehyde Resin, Thermosetting | 23.4 | 15 | 28.4 | 1,471 | 76,000 |
|   Polyester, Thermosetting | 18.1 | 14 | 24.2 | 1,412 | 82,600 |
| Methacrylates: | | | | | |
|   N-butyl Methacrylate | 20.9 | 15 | 27.3 | 1,470 | 77,000 |
|   Iso-butyl Methacrylate | 27 | 15 | 29.8 | 1,483 | 74,000 |
|   Polymeric Methyl Methacrylate | 19.4 | 15 | 26.8 | 1,553 | 90,000 |
|   Monomeric Methyl Methacrylate | 20 | 13 | 27.0 | 1,545 | 88,410 |
|   75 Percent Monomeric, 25 Percent Polymeric Methyl Methacrylate | 22.7 | 15 | 26.8 | 1,563 | 92,000 |
|   Methyl Methacrylate (30 Percent Monomeric, 70 Percent Polymeric) | 25.0 | 15 | 28.2 | 1,578 | 88,000 |
|   Do | 9.3 | 15 | 25.0 | 1,490 | 88,800 |
|   Do | 18.1 | 15 | 26.8 | 1,553 | 90,000 |
|   Do | 27.0 | 15 | 29.8 | 1,561 | 81,800 |
|   Do | 41.2 | 15 | 34.8 | 1,592 | 72,900 |
|   Methyl Methacrylate (50 Percent Monomeric, 50 Percent Polymeric) | 19.5 | 5 | 8.9 | 1,045 | 122,800 |
|   Do | 19.4 | 7 | 12.6 | 1,149 | 104,800 |
|   Do | 18.8 | 12 | 22.0 | 1,411 | 90,500 |
|   Do | 20.3 | 15 | 27.2 | 1,587 | 92,500 |
|   Do | 21.0 | 19 | 34.3 | 1,732 | 87,500 |
|   Do | 21.0 | 22 | 39.6 | 1,896 | 90,700 |
|   (Not Laminated) | 5.98 | 15 | 22.80 | 1,432 | 89,900 |
|   Do | 5.98 | 15 | 22.80 | 1,509 | 99,300 |
|   Do | 8.28 | 15 | 23.65 | 1,533 | 99,400 |
|   Do | 12.66 | 15 | 25.84 | 1,553 | 93,300 |
|   Do | 17.55 | 15 | 27.30 | 1,581 | 91,500 |
|   Do | 35.42 | 15 | 34.00 | 1,638 | 78,800 |
| Vinyls: | | | | | |
|   Polyvinyl Butyral | 15.4 | 16 | 27.2 | 1,563 | 90,000 |
|   60 Parts by Weight, 95% Polyvinyl Acetate and 5% Polyvinyl Chloride, and 40 Parts by Weight Plasticizer | 14 | 17 | 28.3 | 1,570 | 87,000 |
|   95% Polyvinyl Chloride and 5% Polyvinyl Acetate | 5.5 | 18 | 27.7 | 1,629 | 96,000 |
|   Polyvinyl Chloride Plasticized | 15.5 | 17 | 27.6 | 1,573 | 93,000 |
|   Polyvinyl Butyral Chloride | 4.8 | 18 | 28.3 | 1,642 | 95,000 |
|   95% Polyvinyl Chloride and 5% Polyvinyl Acetate | 9.4 | 17 | 27.8 | 1,575 | 89,000 |
|   Polyvinyl Butyral Chloride | 5.1 | 18 | 28.2 | 1,626 | 90,000 |
|   Polyvinyl Chloride 50-50% by Weight with Plasticizer | 31.0 | 16 | 30.0 | 1,566 | 82,000 |
| Polystyrene: | | | | | |
|   Polystyrene Dispersion Plasticized with Diphenylphthalate | 20.8 | 15 | 27.2 | 1,490 | 81,000 |
|   Unplasticized Polystyrene Dispersion | 24.6 | 15 | 28.6 | 1,460 | 74,800 |
| Cellulose Derivatives: | | | | | |
|   Cellulose Acetate Butyrate | 30.0 | 3 | 7.54 | 861 | 98,500 |
|   Do | 30.0 | 8 | 17.64 | 1,142 | 74,000 |
|   Do | 10.0 | 15 | 24.4 | 1,536 | 96,600 |
|   Do | 17.2 | 15 | 25.4 | 1,526 | 91,500 |
|   Do | 24.3 | 15 | 29.9 | 1,602 | 85,900 |
|   Do | 30.0 | 15 | 32.3 | 1,730 | 80,300 |
| Silicones: | | | | | |
|   Polyorganosiloxane | 28.9 | 5 | 10.02 | 995 | 98,500 |
| Nylons: | | | | | |
|   Polyamide | 12.6 | 15 | 24.7 | 1,435 | 83,000 |
|   Do | 22.9 | 15 | 28.0 | 1,482 | 79,000 |
|   Do | 21.2 | 16 | 29.2 | 1,486 | 76,000 |
| Spot Bonded Construction, Methyl Methacrylate, 50% Polymeric 50% Monomeric (on the spots) | 28 | 13 | 20.8 | 1,445 | [1] 100,800 |

[1] Or 105,000 on overall weight basis.

The limiting features with respect to choice of resin are first, it must not be tacky, or phrased differently, it must shatter under impact in order to allow the plate to bend, and not to retard the lateral motion of the lamina indicated illustratively at 38, and second the strength of the bond must not exceed the inertial forces tending to separate the first laminae during the early part of the acceleration phase of the missile's penetration. Numerous other resins suit these specifications. The following table sets forth various resins employed together with the results obtained therefrom, and it will be evident that the obvious equivalents of these resins specified will likewise perform satisfactory.

The above-mentioned "V50" test is a ballistic test for objectively measuring the projectile penetration resistance of an armor plate of a personnel protective armor plate, and essentially consists of firing a number of 17-grain fragmentation-simulating projectiles at various impact velocities at the armor plates being tested. The impact velocity (in ft. per sec.) at which the armor plate stops at least 50% of the projectiles being fired at it at that velocity, is its V50 ballistic limit. In evaluating the V50 test results for personnel protective armor plates, it will be understood that, while a stoppage of only 50% of the projectiles by an armored garment would be of little value in combat, the same garment will stop nearly all projectiles having a slightly lower velocity at the point of impact than that established by the V50 ballistic limit test; in this sense, this test may be compared to load limit tests of structural materials, wherein the point of failure furnishes an indication of the safety limits of the same material if a proper margin of safety is subtracted.

The "merit" factor employed in the foregoing table is arrived at, as explained above by squaring the "V50" rating and dividing it by the weight of the armor plate, expressed in oz. per sq. ft. (e. g. the "merit" factor of an armor plate having a V50 rating of 1471 and weighing 28.4 oz. per sq. ft. is $1471^2/28.4=76,000$). This "merit" factor expresses the concept that a personnel protective armor plate is necessarily a compromise between projectile penetration resistance and weight; i. e., such an armor plate must not only provide adequate projectile penetration resistance, but also must not be so heavy that its use over a substantial area of the body would immobilize the wearer. Of course, light weight, though evidently desirable in a personnel protective armor plate, must not be solely achieved by sacrificing ballistic properties; while no hard and fast figures may be assigned to a resolution of this dilemma, it may be generally stated that an armor plate having a V50 rating of substantially less than about 1000 would be of little value in combat, no matter how light its weight.

It will be seen from Figs. 9, 10 and 11 that the impact of the bullet causes a circular delamination 44 visible from the back side of the armor plate. With specific reference to Fig. 10, the armor plate at the point of full impact recedes to form a hump having sides 46 at steep angles from the plane of the plate. After the kinetic energy of the bullet has been completely absorbed, the laminae return substantially to their original position, but a certain amount of permanent distortion cannot be obviated as is shown in Fig. 11. Of course, the entire plate will recede slightly under impact, but it has been considered unnecessary to illustrate such for the purposes of this description. The diameter of the delamination 44 in the preferred embodiment of my invention herein shown is preferably about three inches. If delamination is substantially greater than three inches, the angle of the hump at 46 caused by penetration of the missile will not be sufficiently great to develop the superior tensile strengths of the nylon. And if the said diameter is substantially smaller than three inches, too much resistance to delamination will be present with the disadvantages outlined above being present.

During penetration of a woven fabric, it will be seen that the missile will tend to spread the individual strands creating a gap rather than actually breaking the strands which are in its immediate path. However, it is, of course, obvious that, in the absorption of kinetic energy, it is highly desirable to break the maximum number of strands. To this end each individual lamina may be bonded by a small percentage of adhesive having an extremely high shear strength, such as rubber latex, and thus, under impact the strands will not separate laterally. However, the rubber latex must not be permitted to bond the laminae one to the other or to interfere with their sliding past one another as indicated at 38 in Fig. 6 for then the desired delamination will not be possible and performance of the armor plate will be extremely poor.

A possible variation from the woven construction illustrated in Figs. 1, 2 and 3 is shown in Fig. 4 and comprises laminae of parallel nylon strands disposed in layers at right angles to each other and being bonded by an adhesive having high shear strength. These laminae are then bonded together by a brittle resin having a low shear and tensile strength. With such a construction, penetration of the bullet will necessarily break the maximum number of strands, but at the same time the laminae will be allowed to separate under impact. The construction shown in Fig. 4, has one disadvantage not present in the woven construction of Figs. 1, 2 and 3, in that it is less resilient. Under impact, the woven construction actually has considerably more resiliency than the construction of Fig. 4 because of the presence of air spaces between the strands, and thus the woven construction bends more freely under impact.

A further variation of our invention is illustrated in Fig. 12 and includes lamina of woven nylon spot bonded firmly together at about two inch intervals with the diameter of the spots being approximately ¾ of an inch. This construction has the advantage of being extremely flexible and can be worn as clothing for personnel. Its only disadvantage, however, is that if the missile happens to strike immediately upon the point of the spot bond, constrained delamination will not take place as freely as desired. However, since the area of the plate surrounding the point of spot bonding is not stiffened by the presence of bonding agent, the plate will recede more readily at the narrow point of impact and consequently reduce the per unit area punching shear force. If the bullet strikes anywhere else, the spot bonded armor plate is entirely satisfactory and its performance is nearly as good as the embodiment herein shown in Figs. 1, 2 and 3.

It will be seen that the spot bonded construction actually employs the same principles of constrained delamination as in the uniformly bonded construction except for the provision of fragments preceding the missile. However, under penetration of a missile, the delamination shown diagrammatically in Figs. 5–8 will take place, and in as much as the points of spot bonding are only approximately two inches apart, the hump created by penetration of the missile will have a substantially sharp angle of slope thereby translating the forces absorbing kinetic energy from shear to tension, and good performance is attained. The plate construction in this manner has been demonstrated to have an average V50 test of 1445 F. P. S. and a merit factor of 100,800 (or 105,000 on weight basis, see chart).

Other materials may be employed in the construction of armor plates in accordance with the principles of constrained delamination and reduction of per unit area punching shear force herein set forth and result in attaining maximum absorption of kinetic energy obtainable with such other material. For instance, "Fortisan," a high tenacity, elongatable fine textile regenerated cellulose fiber made by prestretching and partial saponification of cellulose acetate material, probably in accordance with Patent No. 2,053,766, Dreyfus, and manufactured by Celanese Corporation of America, or finely spun glasses may be substituted for nylon. Furthermore, different types of nylon may be employed in gradation from fully drawn nylon on the impact side to undrawn nylon on the inner side.

While these and other variations of our invention will be evident to those skilled in the art, it is not intended to limit the invention to the precise confines of the preferred embodiment herein shown but rather to measure it in terms of the appended claims.

Having thus described an illustrative embodiment of our invention, what we claim as new and desire to secure by Letters Patent of the United States is:

1. A plastic armor plate for an armored garment, said plate comprising outer, a plurality of intermediate, and inner laminae bonded together, each of said laminae consisting of a plurality of unwoven contiguous parallel high tenacity elongatable plastic textile material strands bonded to each other with an adhesive, and each of said laminae being bonded to an adjacent lamina by a hard brittle synthetic resin adhesive, the direction of the strands in each lamina being substantially at a right angle to the direction of the strands in an adjacent lamina, said second-named adhesive being present in an amount from 5% to 40% by weight of said armor plate, and said first-named adhesive being of greater strength than said second-named adhesive.

2. A plastic armor plate for an armored garment, said plate comprising outer, a plurality of intermediate, and inner laminae bonded together, each of said laminae consisting of a plurality of nylon strands bonded to each other with an adhesive, and each of said laminae being bonded to an adjacent lamina by a hard brittle synthetic resin adhesive, the direction of the strands in each lamina being substantially at a right angle to the direction of the strands in an adjacent lamina, said second-named adhesive being present in an amount from 5% to 40% by weight of said armor plate, and said first-named adhesive being of greater strength than said second-named adhesive.

3. A plastic armor plate according to claim 1, wherein said first-named adhesive is rubber latex.

4. A plastic armor plate according to claim 1, wherein said synthetic resin plastic adhesive is melamine formaldehyde resin.

5. A plastic armor plate according to claim 1, wherein said synthetic resin plastic adhesive is methyl methacrylate resin.

6. A plastic armor plate according to claim 5, wherein said resin is a mixture of monomeric and polymeric methyl methacrylate.

7. A plastic armor plate according to claim 1, wherein said synthetic resin plastic adhesive is polyvinyl chloride and polyvinyl acetate.

8. A plastic armor plate according to claim 1, wherein said synthetic resin plastic adhesive is cellulose acetate butyrate.

9. A plastic armor plate according to claim 1, wherein said synthetic resin plastic adhesive is polyorganosiloxane.

References Cited in the file of this patent

UNITED STATES PATENTS

| Number | Name | Date |
|---|---|---|
| 2,271,961 | Wakeman | Feb. 3, 1942 |
| 2,399,184 | Heckert | Apr. 30, 1946 |
| 2,466,597 | Kropscott et al. | Apr. 5, 1949 |
| 2,562,951 | Rose et al. | Aug. 7, 1951 |